United States Patent
Heyring et al.

(10) Patent No.: US 6,338,014 B2
(45) Date of Patent: *Jan. 8, 2002

(54) CONTROL METHOD FOR VEHICLE SUSPENSION SYSTEM

(75) Inventors: Christopher B. Heyring, Eagle Bay; Ray Heslewood, Busselton; Michael Longman, Dunsborough, all of (AU)

(73) Assignee: Kinetic Limited, Western Australia (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,711

(22) PCT Filed: Jun. 27, 1996

(86) PCT No.: PCT/AU96/00397

§ 371 Date: Apr. 23, 1998

§ 102(e) Date: Apr. 23, 1998

(87) PCT Pub. No.: WO97/01453

PCT Pub. Date: Jan. 16, 1997

(30) Foreign Application Priority Data

Jun. 27, 1995 (AU) .............................................. PN 3843

(51) Int. Cl.[7] .............................. B60G 23/00; G06F 7/00
(52) U.S. Cl. ............................. 701/37; 701/39; 280/5.5; 280/5.504; 280/5.505; 280/5.514
(58) Field of Search .............................. 701/37, 36, 38, 701/39; 280/124.106, 124.13, 124.167, 6.157, 6.158, 5.507, 5.508, 124.104, 124.161, 5.513, 5.52, 5.514, 5.512, 5.503, 124.04, 6.155, 6.154, 5.5, 5.501, 5.504, 5.505

(56) References Cited

U.S. PATENT DOCUMENTS

| | | | | |
|---|---|---|---|---|
| 4,568,101 A | * | 2/1986 | Bleustein et al. | 280/5.514 |
| 4,624,477 A | * | 11/1986 | Kumagai et al. | 280/5.512 |
| 4,647,069 A | * | 3/1987 | Iijima | 280/5.514 |
| 4,803,630 A | * | 2/1989 | Takizawa et al. | 701/39 |
| 4,821,191 A | * | 4/1989 | Ikemoto et al. | 701/38 |
| 5,013,067 A | | 5/1991 | Mine et al. | 280/6.154 |
| 5,103,167 A | | 5/1991 | Mine et al. | 280/6.154 |
| 5,141,245 A | * | 8/1992 | Kamimura et al. | 280/5.514 |
| 5,217,246 A | | 6/1993 | Williams et al. | 280/5.514 |
| 5,430,647 A | * | 7/1995 | Raad et al. | 701/38 |
| 5,447,332 A | * | 9/1995 | Heyring | 280/124.104 |
| 5,556,115 A | * | 9/1996 | Heyring | 280/6.158 |
| 5,562,305 A | * | 10/1996 | Heyring | 280/5.508 |
| 5,601,307 A | * | 2/1997 | Heyring et al. | 280/6.157 |

FOREIGN PATENT DOCUMENTS

| | | |
|---|---|---|
| AU | 23664/92 B | 2/1993 |
| EP | 0376306 | 7/1990 |
| GB | 2009062 | 6/1979 |
| GB | 2224982 | 5/1990 |
| WO | 9301948 | 2/1993 |
| WO | 9319945 | 10/1993 |
| WO | 9511813 | 5/1995 |
| WO | 9511814 | 5/1995 |

* cited by examiner

Primary Examiner—Jacques H. Louis-Jacques (57) ABSTRACT

A method of controlling a vehicle suspension system for a vehicle body supported by a plurality of spaced apart wheels arranged in at least generally diagonally opposite pairs, the vehicle suspension system including an adjustment system for adjusting the position of each of the wheel rams relative to the vehicle body, sensors adapted to generate a signal indicative of the position of each of the wheels, an electronic control unit arranged to receive the signals, wherein the required position for each wheel ram is determined as a function of the diagonal average of the positions of each pair of diagonally opposite wheels, the position of each wheel being adjusted on the basis of the diagonal averages.

24 Claims, 5 Drawing Sheets

CONTROL METHOD FOR VEHICLE SUSPENSION SYSTEM

The application is the national phase under 35 U.S.C. §371 of prior PCT International Application No. PCT/AU96/00397 which has an International filing date of Jun. 27, 1996 ehich designated the United States of America, the entire contents of which are hereby incorporated by reference.

BACKGROUND OF THE INVENTION

1. Field of the Invention

The present invention is generally directed to vehicle suspension systems, and in particular, to a control method for controlling vehicle suspension systems. The present invention is described with respect to suspension systems developed by the applicant. It is however to be appreciated that the control method is also applicable for other vehicle suspension systems.

2. Description of the Background Art

The Applicant has developed a suspension system disclosed in Australian Patent Application No. 23664/92, details of which are incorporated herein by reference. This suspension system incorporates double acting rams for each vehicle wheel. The upper and lower chambers of each front wheel ram is respectively interconnected with the lower and upper chambers of the diagonally opposite rear wheel ram to provide a fluid circuit thereof. A corresponding fluid circuit is provided with the other front wheel ram and rear wheel ram. The two fluid circuits are interconnected by a load distribution unit which is arranged to maintain at least substantially equal pressure in the two fluid circuits.

In the Applicant's International Application No. PCT/AU94/00646, there is disclosed a control arrangement for the above described suspension system incorporating a control arrangement for maintaining the vehicle in a position at least substantially parallel to the plane of the ground upon which the vehicle is traversing, details of which are also incorporated herein by reference. The control arrangement includes sensor means adapted for generating a signal indicative of the extension of each wheel ram, and therefore the position of each of the wheels relative to the vehicle body. The control arrangement then determines the average height of the vehicle body at selected locations between respective pairs of orthogonally adjacent wheels. Adjustment means are provided to adjust the quantity of fluid in the fluid circuits communicating with the rams of the said orthogonally adjacent wheels to establish the preset datum height between the orthogonally adjacent wheels and the vehicle body at the said selected locations.

The wheel rams are described as being adjusted in orthogonal pairs to avoid disturbing the position of the load distribution unit as the fluid quantity in each circuit is adjusted in the above application. However, because of the interconnection between the wheel rams, adjustment of the average height between one orthogonal wheel pair can produce a change in the average height between other orthogonal wheel pairs which can result in the overshooting of the average height between the other orthogonal wheel pairs past the desired height. The control arrangement must therefore adjust the average height between each of the orthogonal wheel pairs over a number of steps in an iterative process to progressively minimise this height error until the required average height is reached between each pair. This means that the fluid must be pumped and released from each of the fluid circuits over a number of steps to bring the vehicle body to a position parallel to the plane of the ground.

The primary problem of such an iterative process is that a large amount of fluid must be cycled to and from the circuits with fluid being pumped into and removed from each fluid circuit over a number of cycles until the vehicle reaches it is final position. Therefore, much energy and time is wasted in this iterative process.

It is therefore advantageous to have a control method which allows for faster adjustment of the vehicle body position.

SUMMARY OF THE INVENTION

With this in mind, the present invention provides a method of controlling a vehicle suspension system for a vehicle body supported by a plurality of spaced apart support means arranged in at least generally diagonally opposite pairs, the vehicle suspension system.including adjustment means for adjusting the position of each of the support means relative to the vehicle body, sensor means adapted to generate a signal indicative of the position of each of the support means, and control means arranged to receive said signals, the method including determining the position of each support means, determining a diagonal average for each pair of diagonally opposite support means, the diagonal average being the average of the position of one support means and the position of the diagonally opposite support means, wherein the required position for each support means is a function of at least two said diagonal averages, the position of each support means being adjusted on the basis of the said at least two diagonal averages.

As the control method determines the required position of each wheel individually, this provides for a faster adjustment of the vehicle position.

The control method preferably includes determining the diagonal average of the front left and back right wheels of the vehicle, and the diagonal average of the front right and back left wheels of the vehicle. The control method may then determine the difference between the diagonal averages to provide the "total articulation" of the vehicle. The term "articulation" refers to the situation where the first pair of the diagonally opposite wheels moves together in a common direction and the position of the second pair of wheels remains unchanged or moves together in an opposing common direction to the first pair thereof such that there is relative displacement between each pair of diagonally opposite wheels. As well as providing an indication of the degree of articulation of the wheels of the vehicle, the determination of the total articulation of the vehicle also indicates the flatness of the terrain upon which the vehicle is supported. When the vehicle position is on a flat surface, then the respective diagonal averages would be the same showing that the vehicle is not in articulation. When the vehicle is resting on or travelling over an undulating surface, the respective diagonal averages can differ showing that the vehicle is in articulation.

A "height set point" may be selected, this height set point being the desired height of the vehicle. A single overall height set point may be selected. Alternatively, the height set point may consist of a front height set point and a back height set point to allow pitch attitude adjustment of the system. These height set points may be manually selected by the driver of the vehicle and/or may be automatically selected by the control means in dependence on predetermined conditions. The height set points of the vehicle may for example be adjusted as a function of the vehicle speed. The height set points may be lowered when the vehicle is above a predetermined speed. The vehicle will generally only be moving at high speeds when the vehicle is not in an off road location where a lower height set point is desired.

The control method may also take into account any difference in the roll stiffness between the front and back of a vehicle which will vary between different models of vehicles. The ratio of the roll stiffness of the front of the vehicle and the total roll stiffness of the vehicle is referred to as the "Roll Split" or "Roll Couple Distribution" of the vehicle which will be a constant value for that vehicle. When the roll stiffness of the front and rear of the vehicle is the same, the Roll Split constant would be 0.5.

The wheel positions may preferably be measured on the basis of a calibrated scale to take into account differences such as in the relative degree of extension between the front and rear wheels. Each wheel position may for example be measured on a scale between 0 and 1. A wheel position may be designated to be at 0 when the wheel is fully retracted, i.e at or near the bump stop, and may be designated to be at 1 when at or near full extension. The other wheels may be calibrated on the same scale taking into account possible different wheel travel positions. It is alternatively possible to measure the actual extension of the wheels for the determination.

The control method may therefore determine the required position or the wheel set points of each wheel as follows:

$$FWSP=FSP\pm(1.0-RS)\times(D1-D2)$$

$$BWSP=BSP\pm RS\times(D1-D2)$$

where

FWSP is the wheel set point for the front wheels,

BWSP is the wheel set point for the back wheels,

FSP is the front height set point of the vehicle,

BSP is the back height set point of the vehicle,

RS is the Roll Split constant for the vehicle, and

D1, D2 are the respective diagonal averages for each pair of diagonally opposite wheels.

The position of each wheel relative to the vehicle body may be continuously adjusted on the basis of the above noted control method. Alternatively, the control method can be initiated at regular or irregular intervals, and the wheels adjusted at that time. The periods between initiation of the control method could for example be as little as 10 milliseconds which provides sufficient time for the valves controlling the fluid flow to and from the fluid circuits to open and close.

When the vehicle is moving, it may not be necessary to continually adjust the position of each wheel to wheel set points determined by the control method. For example, the average wheel position of each wheel over a preset period could be determined and the wheel set points determined on the basis of the average wheel positions. It is alternatively possible to do a series of wheel set point determinations over a preset period to thereby obtain the average wheel set points over that preset period. The average wheel positions will also be determined over that period and the wheel positions adjusted on the basis of the average wheel set points and average wheel positions. However, at start up, where significant changes in the load distribution in the vehicle can arise as a result of people and other loads being placed within the vehicle, the actual instantaneous wheel set point of each wheel determined by the control method can be used to adjust the wheel positions to thereby quickly position the vehicle in response to those load changes.

The control means may also determine the rate of change of the vehicle speed. Therefore, if the rate of change of the speed is above a certain rate, then the control method will not adjust the wheel positions. This will take into account when the vehicle is braking or accelerating when such adjustment of the wheel positions are not required or desired.

In another arrangement a door sensor may be provided to sense the closing of the door so that the control method will only be actuated after the occupants are within the vehicle.

In the vehicle suspension system described in international application no. PCT/AU94/00646, a load distribution unit is provided to equalise the fluid pressures between the two fluid circuits to thereby at least substantially distribute the load between the wheels of the vehicle. One of the described embodiments of the load distribution unit includes two separate displaceable piston assemblies mounted in a series arrangement and moveable along a common axis, each piston assembly including a piston rod and a piston supported thereon. It is however to be understood that although the following description will refer to the above noted arrangement, the housings are in practice located adjacent to each other such that the piston assemblies move along adjacent parallel axes. Each piston is slideably mounted within a respective housing and separates the chamber into inner and outer chambers, these chambers being in communication with the conduits connecting the wheel rams. A "front bump" chamber is also provided between the housings for accommodating an inner end of each piston rod. Respective "back bump" chambers are also provided on the opposing side of each housing, each back bump chamber accommodating a respective outer end of one of the piston rods. Fluid accommodated within the front bump chamber is compressed when both the front wheels of the vehicle go over a bump whereas the fluid in the back bump chambers are compressed when both the back vehicle wheels goes over a bump. It is noted that this arrangement can be reversed by changing the interconnection of the load distribution unit with the wheel rams. Addition or removal of fluid from the front bump and back bump chambers control the position of each piston relative to its respective housing. It should be noted that in alternative embodiments of the load distribution unit, the pistons are supported on a single piston rod. Alternatively, a solid resilient member can be provided between the two piston rods. In both of these embodiments, there is little to no relative displacement between the pistons, and the pistons move together as a unit.

When the wheels are in articulation, the piston assemblies move in tandem and there is no relative movement between them. However, when a load is placed in the back or the front of the vehicle, the piston assemblies will move respectively closer or further apart so that there is relative movement between the piston assemblies.

Each piston assembly is ideally located at an intermediate position when the wheels are not in articulation, and move away from that intermediate position when a load is placed on one end of the vehicle and/or when the wheels are in articulation. At this intermediate position, the pistons may be located approximately half way between the end walls of each housing to provide maximum clearance therebetween to thereby provide unimpeded movement of the pistons. The pistons will move away from their intermediate position when the wheels are in articulation but should ideally return to that intermediate position when the wheels are not in articulation. However, due to non-linearities in the sensor means and so on resulting in an error in the position of, the piston assemblies from the intermediate position even when the wheels are not in articulation which can possibly adversely affect the operation of the load distribution unit.

Sensor means are therefore also provided to determine the position of each of the piston assemblies and thereby enable adjustment of the position of the piston assemblies, for example by controlling the fluid flow into and out of that load distribution unit. It is to be noted that in the alternative embodiments of the load distribution unit where the pistons move as a unit, only one sensor means is required.

The control method according to the present invention therefore also preferably includes controlling the position of the piston assemblies of the load distribution unit. The position of each piston may be measured on the basis of a calibrated scale between 0 and 1. The wheels of the vehicle may be articulated in one direction physically or in a computer model of the suspension system until the difference between the respective diagonal averages is equal to 1.0 (i.e D1−D2=1.0) showing that the wheels are fully articulated in one direction. The position of the piston at full articulation is designated to be at 0. The wheels are then articulated in the opposing direction until the difference between the respective diagonal averages is equal to −1.0 (i.e D1−D2=−1.0) showing that the wheels of the vehicle are fully articulated in the opposing direction. The piston position may therefore be measured and determined on the basis of a scale from 0 to 1.

The load distribution unit will preferably need to be "centred" such that the pistons will be at the required intermediate positions when the vehicle is not in articulation. To this end, the position of each piston will preferably be displaced to satisfy the following equation;

$$PAV = \frac{P1 + P2}{2} = 0.5$$

where
  PAV is the average position of the pistons, and P1, P2 are the respective positions of each piston.

The pistons of the load distribution unit are preferably initially centred to the required position during, for example periodic servicing of the vehicle. This may be achieved by adding or removing fluid from the front bump chamber of the load distribution unit to maintain a predetermined regulating pressure therein. At the same time, the pistons of the load distribution unit may be centred by adding or removing fluid from the back bump chambers of the load distribution unit so that the average position of the pistons relative to the end walls of their respective housing is 0.5. This will allow correction of the positioning of the pistons even when the wheels are in articulation during the centring procedure because the average position of the pistons are corrected.

Once the load distribution unit is adjusted as above, a fixed amount of fluid may be maintained within the front bump chamber. During subsequent operation of the vehicle, the load distribution unit can be centred by adding or removing fluid from the back bump chambers only.

The set points of each of the pistons can be determined on the basis of the following equation;

$$LDUSP = 0.5 \pm \frac{D1 - D2}{2}$$

where
  LDUSP is the set point of each piston of the load distribution unit, and D1, D2 are the respective diagonal average of each pair of diagonally opposite wheels, the diagonal averages being expressed on a scale between 0 and 1.

This determination takes into account the total articulation of the wheels and determines when the pistons are not in the required position.

The pistons may then be displaced to the required position by adding fluid to the inner chamber and removing fluid from the outer chamber of one housing and adding fluid to the outer chamber and removing fluid from the inner chamber of the opposing housing to move the pistons in tandem in one direction while maintaining the relative distance between them. The pistons can be moved in tandem in the other direction by reversing the fluid flow.

It should be noted that the above determination of the load distribution unit set points is only required for one piston in the alternative embodiments where the pistons move together as a unit.

The control means may be an electronic control unit. It is however also possible for the control means to comprise analogue or mechanical means.

It will be convenient to further describe the invention by reference to the accompanying drawings which illustrates possible control methods of the invention. Other embodiments of the control method of the invention are possible, and consequently the particularity of the accompanying drawing is not to be understood as superseding the generality of the preceding description of the invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
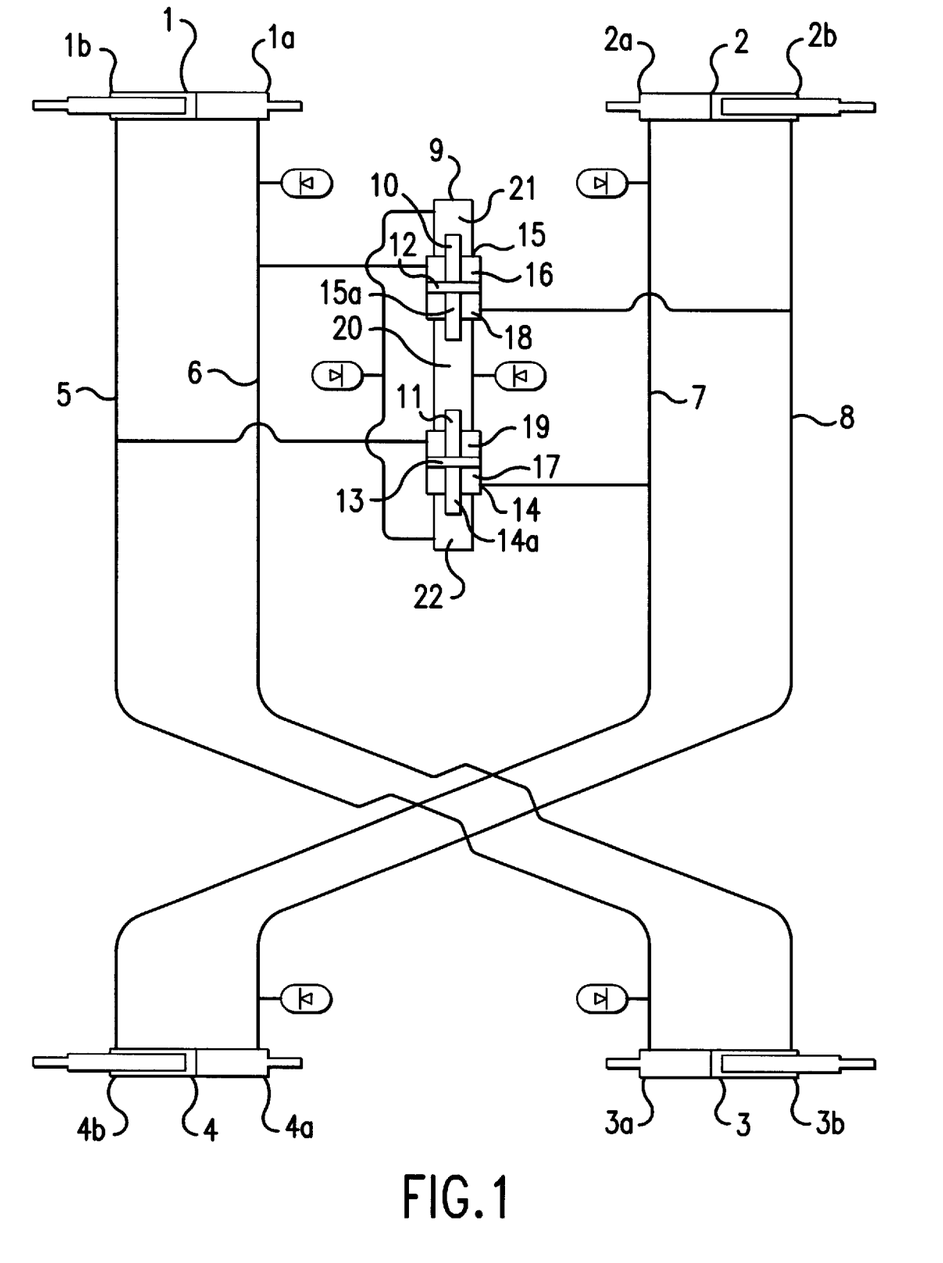
FIG. 1 is a schematic view of a vehicle suspension system.

FIG. 1 shows a vehicle suspension system comprising four wheel rams, 1, 2, 3, 4. Each wheel ram has an upper chamber 1a, 2a, 3a, 4a and a lower chamber 1b, 2b, 3b, 4b, with conduits 5, 6, 7, 8 interconnecting the upper chamber of each wheel ram with the lower chamber of the diagonally opposite wheel ram to thereby provide a fluid circuit between each diagonally opposite wheel ram.

A load distribution unit is in communication in each of the conduits 5, 6, 7, 8 to ensure at least substantially uniform pressure between the two fluid circuits. The load distribution unit 9 includes two housings 14, 15, each respectively accommodating a piston assembly 14a, 15a. Each piston assembly includes a piston rod 10, 11 supporting a respective piston 12, 13. Each piston divides its respective housing into an inner chamber 18, 19 and an opposing outer chamber 16, 17. A front bump chamber 20 is provided between the housings 14, 15 to accommodate an inner end of the piston rods 10, 11. Back bump chambers 21, 22 are provided on the opposing side of each housing 14, 15 to accommodate an outer end of the respective piston rods 10, 11. The position of the piston assemblies 14a, 15a can initially be centred by adding or removing fluid from the back bump chambers 21, 22 while regulating the pressure within the front bump chamber 20 to set the load distribution unit 9 prior to operation of the vehicle. The position of the piston assemblies 14a, 15a can be controlled during operation of the vehicle by the addition or removal of fluid from the inner chambers 18, 19 and the outer chambers 16, 17.

Figure 2:
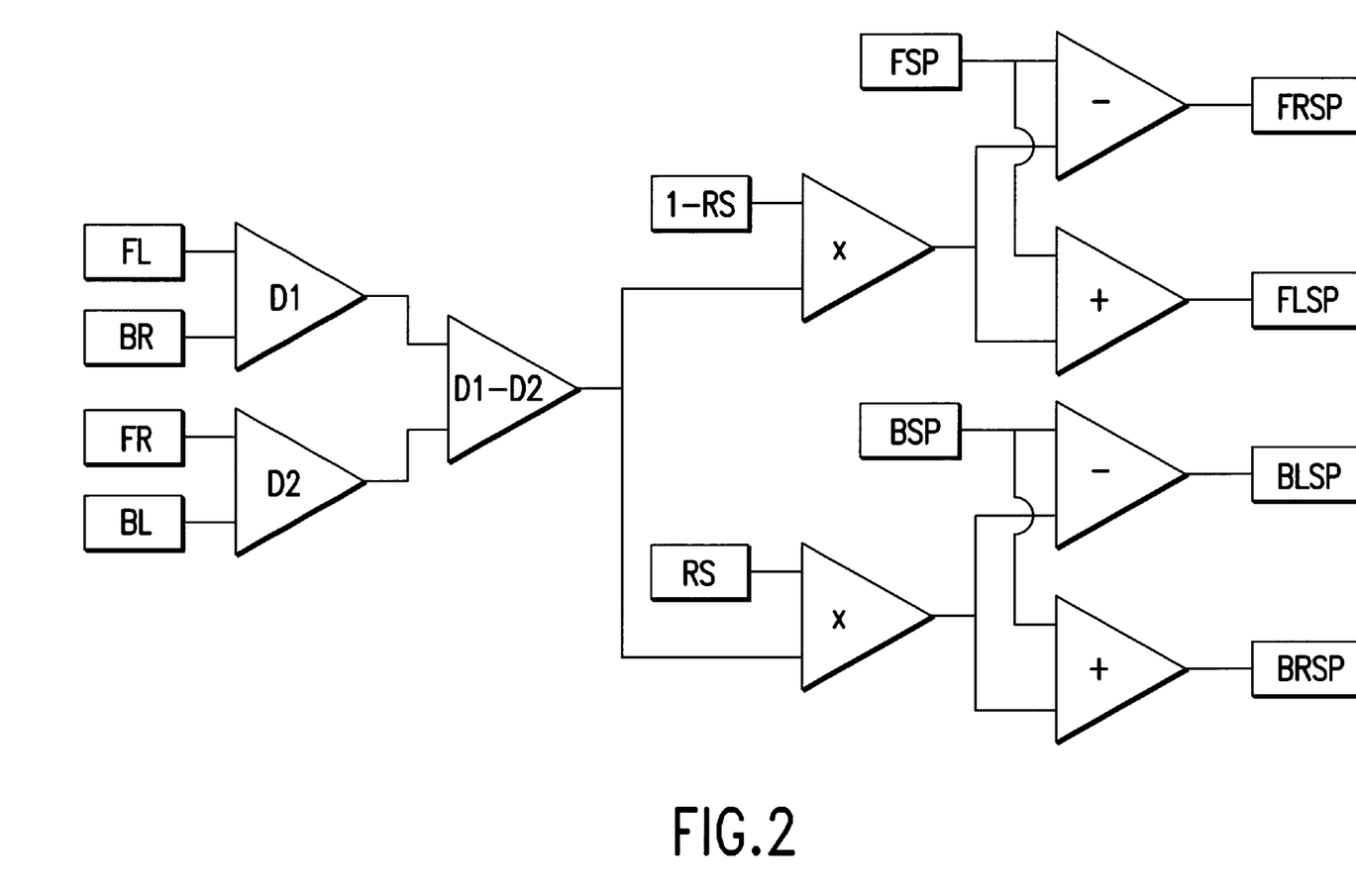
FIG. 2 is a flow chart showing the basic control method for determining the wheel set points according to the present invention.

Referring to FIG. 2, the sequence of the control method when used to determine the wheel position set points is shown as a flow chart. The position of the front left wheel (FL), back right wheel (BR), front right wheel (FR) and back wheel (BL) are initially measured. The diagonal average (D1, D2) of each diagonally opposite pair of wheels is then determined. The difference (D1−D2) between the diagonal averages (D1, D2) is then determined to provide an indication of the total articulation of the wheels of the vehicle.

Each vehicle model has a specific roll split constant (RS), also known as the "roll couple distribution", which is the ratio of the roll stiffness of the front of the vehicle and the total roll stiffness of the vehicle. The portion of the articulation required for the front of the vehicle is therefore determined by multiplying the difference between the diagonal averages (D1−D2) with a figure equal to the roll split constant (RS) subtracted from 1.0. The portion of articulation required at the back of the vehicle is determined by multiplying the difference between the diagonal averages (D1−D2) with the roll split constant (RS). A height set point (SP), which is the required average height of the vehicle, can be set manually by the driver. Alternatively, the height set point (SP) may be automatically selected. Therefore, to obtain the required wheel position set points, the portion of articulation previously determined can be respectively added or subtracted from the height set point (SP) to determine the set points of the front right wheel (FRSP), front left wheel (FLSP), back left wheel (BLSP), and back right wheel (BRSP). Alternatively an individual front height set point (FSP) and back set point (BSP) can be used.

The procedure of determining the wheel set points for each wheel can be shown as equations as follows:

| Front Right Wheel | FRSP = FSP − (1.0 − RS) × (D1 − D2) |
| Front Left Wheel | FLSP = FSP + (1.0 − RS) × (D1 − D2) |
| Back Left Wheel | BLSP = BSP − RS × (D1 − D2) |
| Back Right Wheel | BRSP = BSP + RS × (D1 − D2) |

The wheels can be set to the required wheel set points by adding or removing fluid from the chambers of each wheel ram. It should be noted that this procedure for determining the wheel setpoints could be used on any vehicle suspension system.

Figure 3:
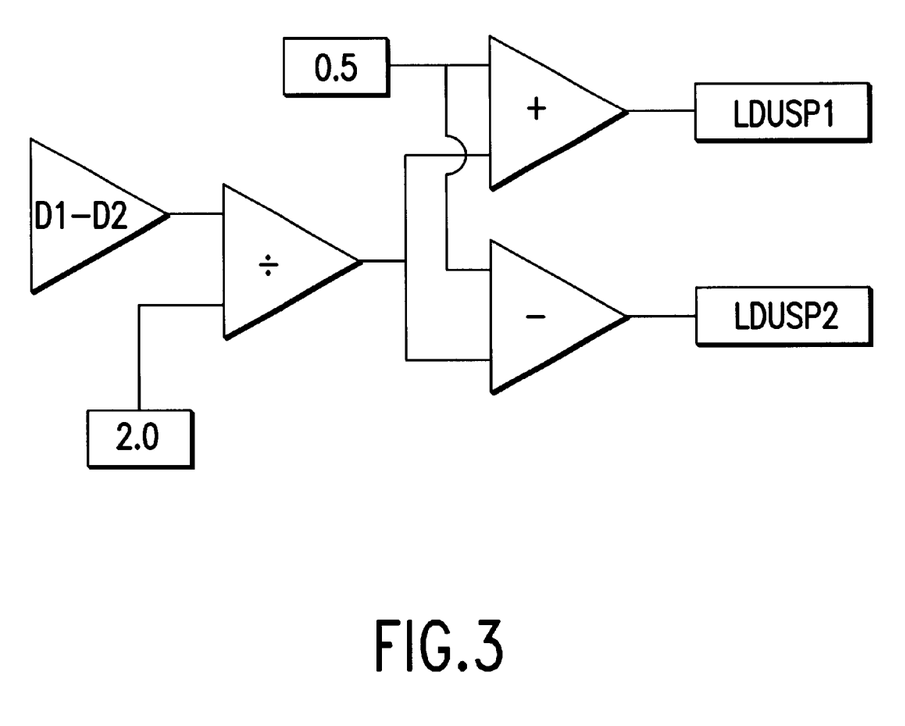
FIG. 3 is a flow chart showing the control method for determining the load distribution unit set points according to the present invention.
Figure 4:
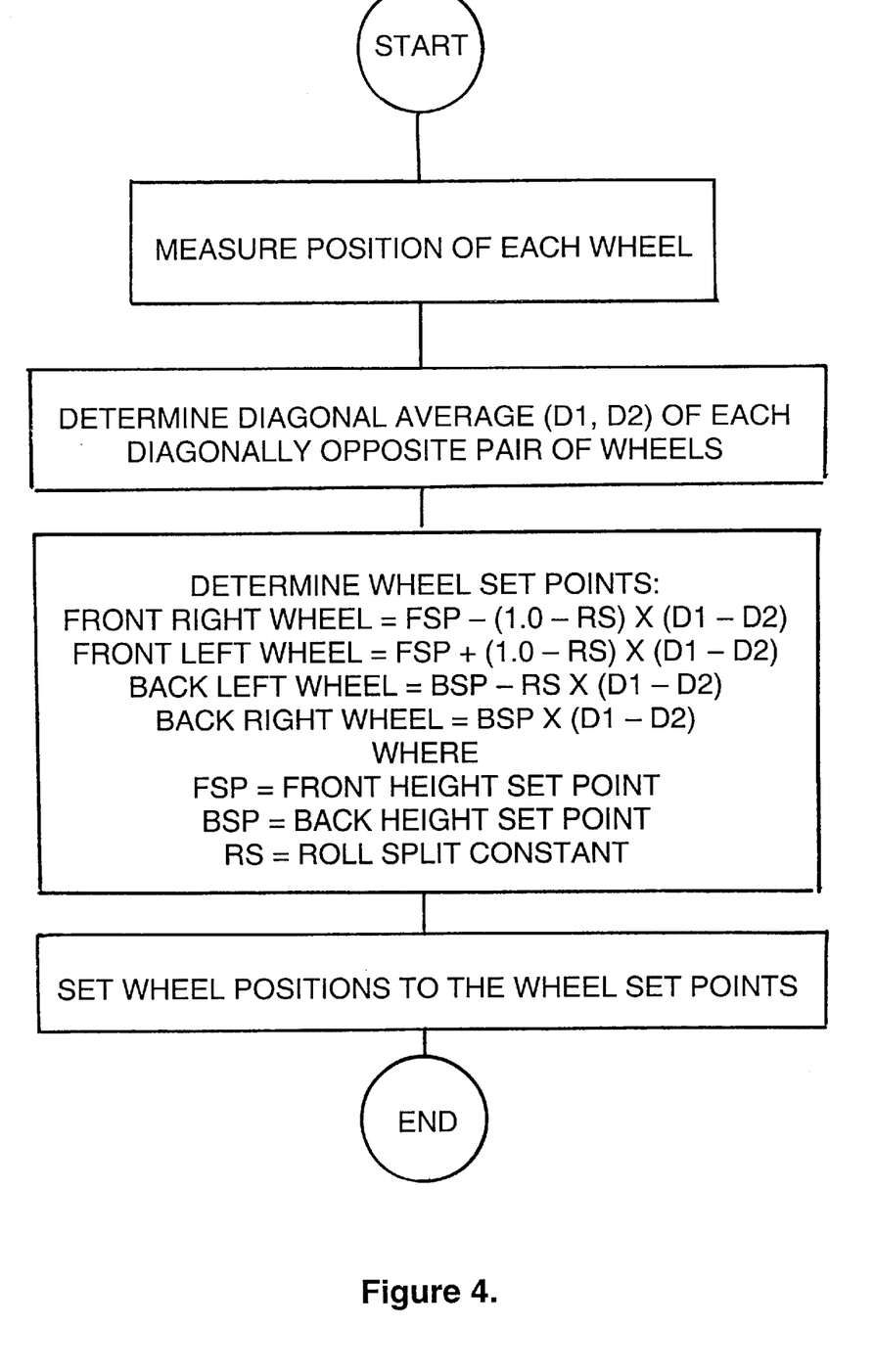
FIG. 4 is a flow chart showing a portion of the control method according to the present invention.
Figure 5:
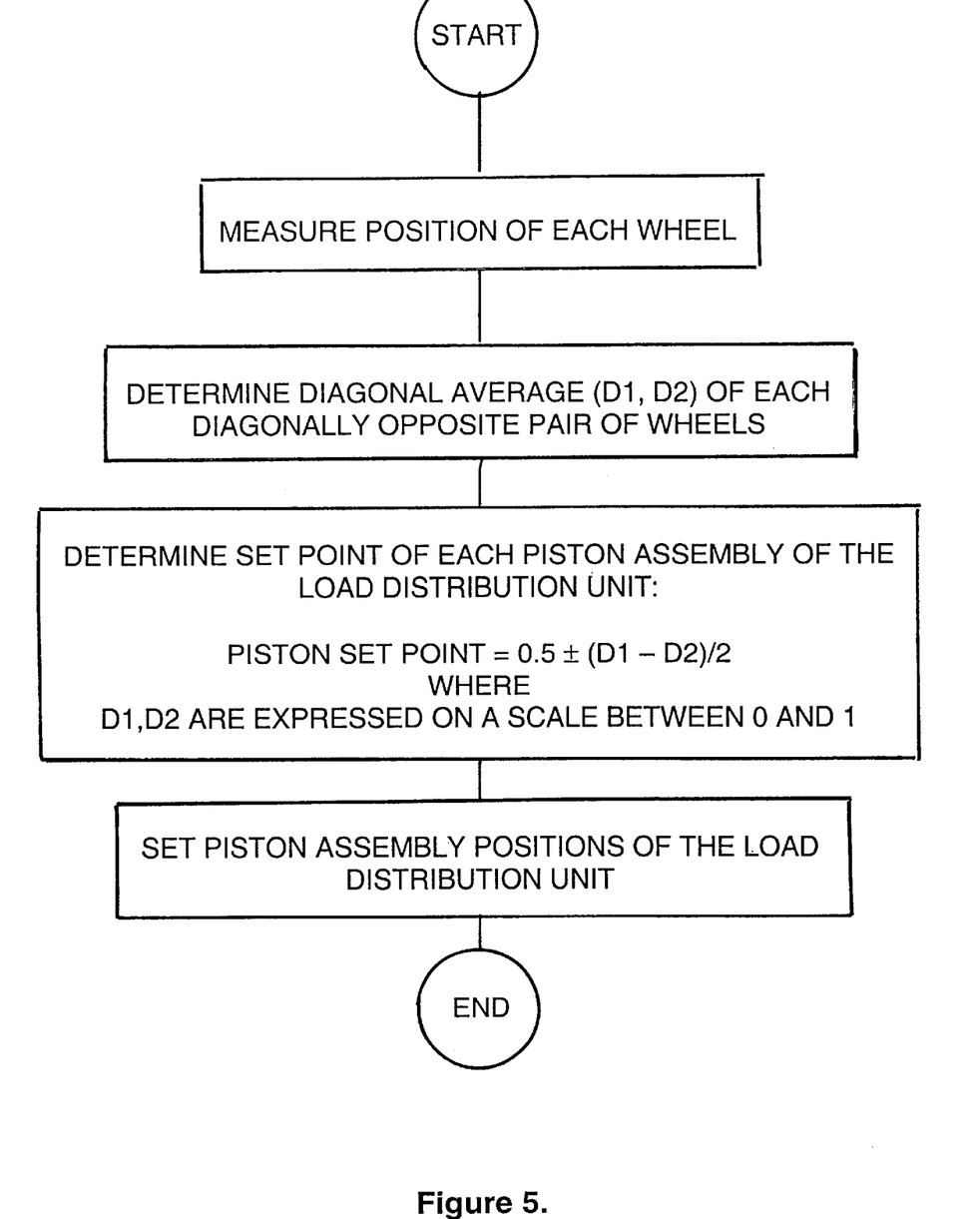
FIG. 5 is a flow chart showing another portion of the control method according to the present invention.

The control method can also control the position of the piston assemblies 14a, 15a of the load distribution unit 9 as shown in FIG. 3. The difference between the diagonal averages (D1−D2) is then divided by two and then added or subtracted from 0.5 to respectively obtain the set point of each piston assembly (LDUSP1, LDUSP2).

This control method for determining the set point of each piston of the load distribution unit can be shown as an equation as follows:

$$LDUSP1 = 0.5 + \frac{D1 - D2}{2}$$

$$LDUSP2 = 0.5 - \frac{D1 - D2}{2}$$

In this equation, the diagonal means D1, D2 are expressed on a scale between 0 and 1.

The control method according to the present method provides a procedure for determining the required position of each wheel to thereby allow rapid adjustment of the height of the vehicle. The control method also preferably allows the wheel positions to be correctly adjusted even when the wheels are in articulation. Although this control method has been described with respect to the Applicants' vehicle suspension system, the control method can also be used on other passive or active suspension systems where the wheel positions can be adjusted.

We claim:

1. A method of controlling a vehicle suspension system for a vehicle body supported by at least two forward and two rearward support means, the two forward support means being laterally spaced apart, one on each side of the vehicle, forming a front left and a front right support means, the two rearward support means being laterally spaced apart, one on each side of the vehicle forming a rear left and a rear right support means, the vehicle suspension system comprising adjustment means for adjusting the position of each of the support means relative to the vehicle body, sensor means adapted to generate a signal indicative of the position of each of the support means, and control means arranged to receive said signals, determine the position of each support means, and determine the required position for each support means as a function of a desired vehicle height, wherein the method further comprises:

determining at least a first diagonal average from the front left and rear right support means positions and a second diagonal average from the front right and rear left support means positions; and determining the difference between said diagonal averages, the required position for each support means being a function of at least said first and second diagonal averages.

2. A method according to claim 1, the method including obtaining a desired front vehicle height and a desired back vehicle height.

3. A method according to claim 1, wherein the desired vehicle height(s) is manually selected by the driver of the vehicle.

4. A method according to claim 1, wherein the desired vehicle height(s) is automatically selected by the control means in dependence on predetermined conditions.

5. A method according to claim 4 wherein the desired vehicle height(s) is adjusted as a function of the vehicle speed.

6. A method according to claim 5 wherein the desired vehicle height(s) is lowered when the vehicle is above a predetermined speed.

7. A method according to claim 6, wherein the method includes determining a rate of change of a speed of the vehicle and adjusting the position of each support means only when the rate of change is below a predetermined rate.

8. A method according to claim 5, wherein the method includes determining a rate of change of a speed of the vehicle and adjusting the position of each support means only when the rate of change is below a predetermined rate.

9. A method according to claim 1 wherein the required position for each support means is further determined as a function of the Roll Split constant for the vehicle.

10. A method according to claim 9 wherein the required position of each support means is determined as follows:

FWSP=FSP±(1.0−RS)×(D1−D2)

BWSP=BSP±RS×(D1−D2)

where
FWSP is the required position for the front support means,
BWSP is the required position for the back support means,
FSP is the desired overall front vehicle height,
BSP is the desired overall back vehicle height,
RS is the Roll Split constant for the vehicle, and
D1, D2 are the respective diagonal averages of each pair of diagonally opposite support means.

11. A method according to claim 1 wherein the method includes continually adjusting the required position for each support means.

12. A method according to claim 1 wherein the method includes initiating the control method at intervals and adjusting the required positions of each support means at that time.

13. A method according to claim 1 wherein the method includes determining the average position of each support means over a preset period and determining the required position of each support means on the basis of the average positions thereof.

14. A method according to claim 1 wherein the method includes conducting a series of required position determinations for each support means over a preset period to thereby obtain the average required position of each support means over that period, determining the average position of each support means over that period and adjusting the position of each support means on the basis of the obtained average required position of each support means and the average position of each of the support means.

15. A method according to claim 14 wherein, during start-up of the vehicle, the actual instantaneous required position of each support means determined by the control method is used to adjust the positions of each support means.

16. A method according to claim 1 including providing a door sensor to sense the closing of the door so that the control method will only be actuated after the door is closed.

17. A method according to claim 1 wherein the vehicle suspension system includes individual fluid rams arranged between each support means and the vehicle body.

18. A method according to claim 17 wherein each fluid ram includes a double acting ram having a first and second chamber, and conduit means individually communicating the first chamber of the respective rams with the second chamber of the respectively diagonally opposite ram to provide fluid circuits therebetween, the adjustment means varying the quantity of fluid in said fluid circuits to thereby adjust the position of each said support means.

19. A method according to claim 18 wherein the suspension system includes a load distribution unit for equalising the fluid pressures between the fluid circuits to thereby at least substantially distribute the load between the support means of the vehicle, the load distribution unit including two separate displaceable piston assemblies each slideably mounted in a respective housing, and separating the housing into two chambers, each of the chambers being in communication with one of the conduits connecting the fluid rams, and at least one sensor means for sensing the position of each piston assembly, the control method further including controlling the position of the piston assemblies of the load distribution unit.

20. A method according to claim 19 wherein the position of each piston assembly is centred such that, when measured on the basis of a calibrated scale between 0 and 1, the position of each piston satisfies the following equation;

$$PAV = \frac{P1+P2}{2} = 0.5$$

where
PAV is the average position of the piston assemblies, and
P1,P2 are the respective positions of each piston assembly.

21. A method according to claim 19 wherein the required position of each piston assembly is determined on the basis of the following equation;

$$LDUSP = 0.5 \pm \frac{D1-D2}{2}$$

where
LDUSP is the required position of each piston assembly of the load distribution unit, and
D1,D2 are the respective diagonal average of each pair of diagonally opposite support means, the diagonal averages being expressed on a scale between 0 and 1.

22. A method according to claim 21 including displacing the piston assemblies by adding and removing fluid respectively from each said two chambers.

23. A method according to claim 1, wherein each support means is in the form of at least one wheel.

24. A method of controlling a vehicle suspension system for a vehicle body supported by a plurality of spaced apart support means arranged in at least generally diagonally opposite pairs, the vehicle suspension system including adjustment means for adjusting the position of each of the support means relative to the vehicle body, sensor means adapted to generate a signal indicative of the position of each of the support means, and control means arranged to receive said signals, the method including:
determining the position of each support means;
determining a diagonal average for each pair of diagonally opposite support means, the diagonal average being the average of the position of one support means and the position of the diagonally opposite support means, the required position for each support means being a function of at least two said diagonal averages;
determining the difference between said diagonal averages; and
adjusting the position of each support means on the basis of the difference between said diagonal averages.

* * * * *